July 28, 1942.  C. E. BLALACK  2,291,182
ENDLESS CHAIN CUTTER FOR MOWING AND HARVESTING MACHINES
Filed Feb. 2, 1940  2 Sheets-Sheet 1
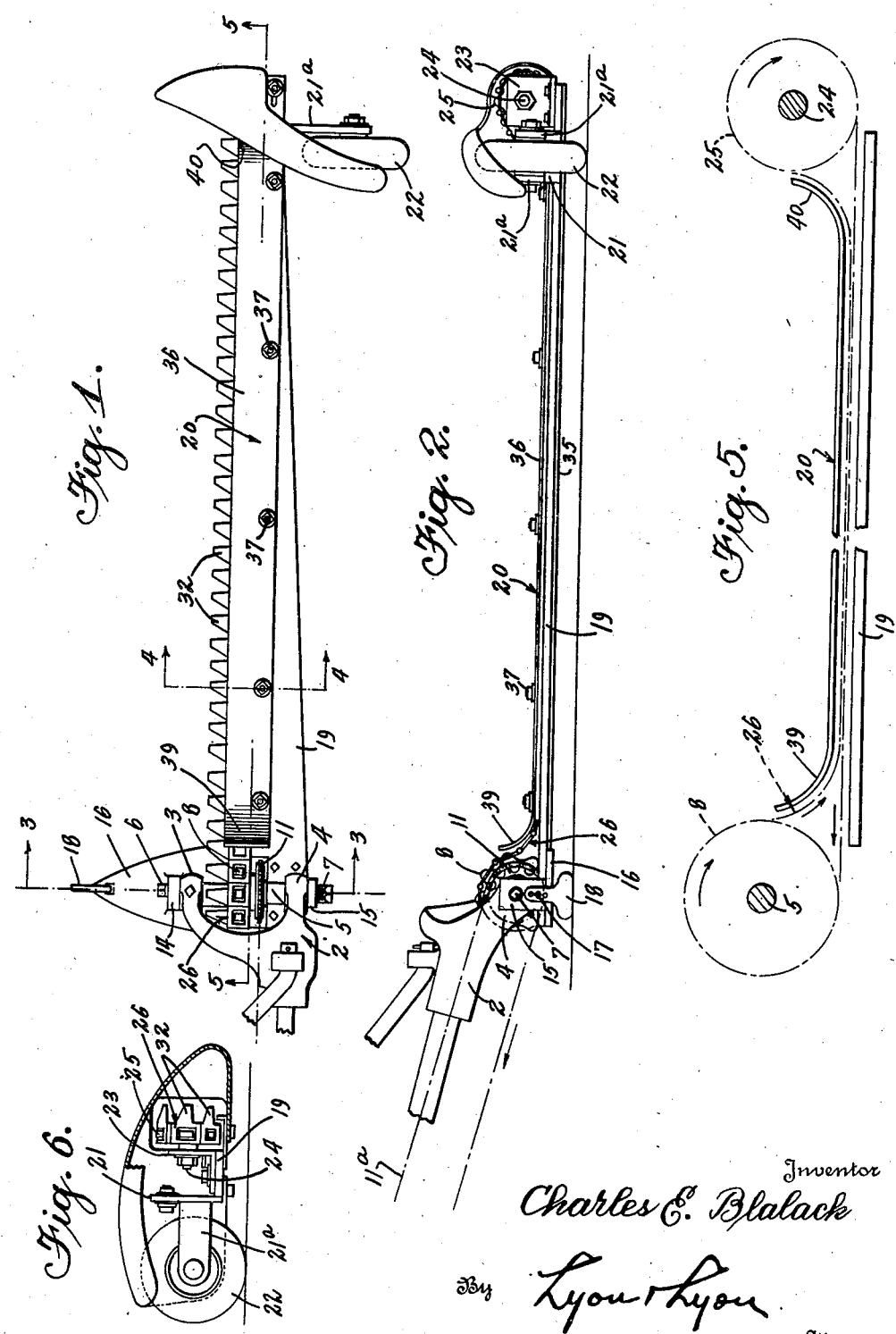
Inventor
Charles E. Blalack
By Lyon & Lyon
Attorneys July 28, 1942.                C. E. BLALACK                2,291,182
         ENDLESS CHAIN CUTTER FOR MOWING AND HARVESTING MACHINES
                  Filed Feb. 2, 1940            2 Sheets-Sheet 2
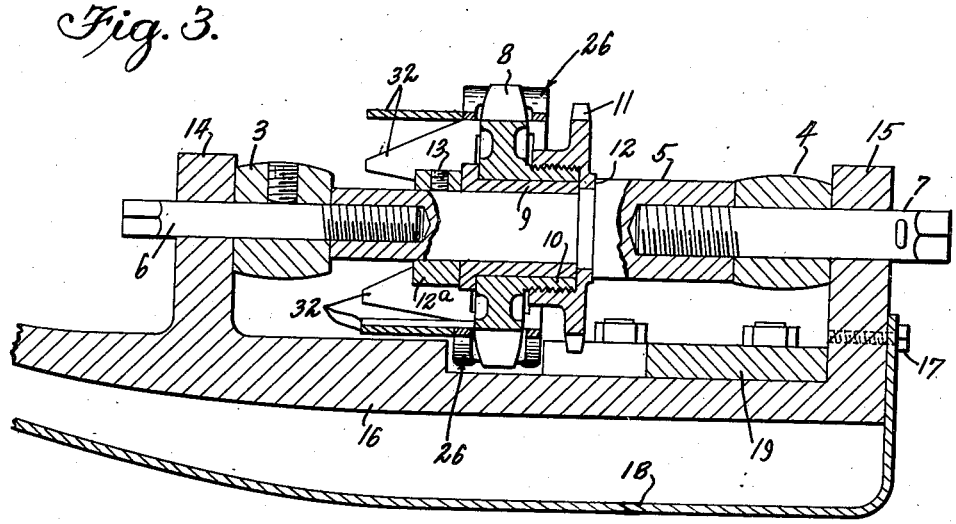
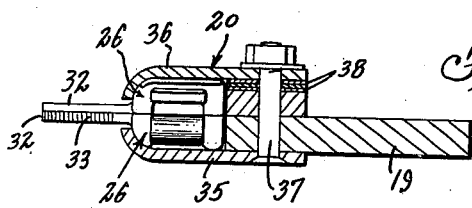
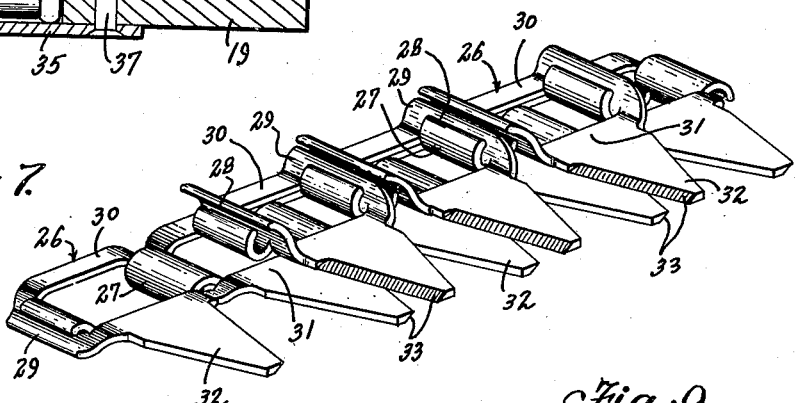
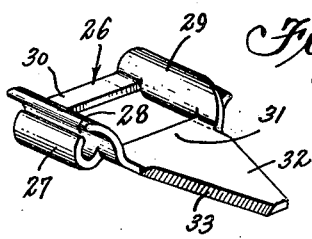
Inventor
Charles E. Blalack
By Lyon & Lyon
Attorneys Patented July 28, 1942

2,291,182

UNITED STATES PATENT OFFICE 2,291,182

ENDLESS CHAIN CUTTER FOR MOWING AND HARVESTING MACHINES

Charles E. Blalack, El Centro, Calif.

Application February 2, 1940, Serial No. 316,944

7 Claims. (Cl. 56—291)

This invention relates to the cutter or sickle of a mower or harvesting machine, and refers particularly to an endless chain cutter.

At present, the mowers in general use are provided with a stationary cutter bar with which cooperates a reciprocating cutter bar, which is reciprocated by the operation of the pitman. Such mowers may be effectively operated at a maximum speed of about three miles per hour, and at such speed the pitman operates at about 800 revolutions per minute composed of 1,600 starts and stops per minute on the reciprocating cutter bar. Attempts to operate the mower at any higher speed than about three miles per hour results in rapid destruction of the mower. With the introduction of the modern rubber tire tractors it is desirable at times to operate mowers at a speed of eight or ten miles per hour.

It is a general object of the present invention to provide a mower capable of being operated at high speeds without the attendant high rate of wear or destruction characteristic of the present reciprocating type of mower.

In accordance with the present invention, the cutter of the mower is provided by an endless chain, the individual links of which chain are provided with cutting blades and two sides of the chain positioned for cooperative cutting action. In the mower of the present invention the cutters are constantly moving at uniform speed as distinguished from the reciprocating type of action of the cutters now in use, with the result that the cutters may be operated at considerably reduced speed and still effect the same cutting operation. Thus, for example, a standard mower of the reciprocating cutter bar type for each 36 inches of wheel travel moves the cutting bar a distance of 60 inches, whereas with the mower of the present invention equal cutting may be accomplished with a movement of the cutting chain of only 15 inches, although somewhat higher speeds for improved mowing are preferred, such as, for example, 24 inches.

The endless chain cutters heretofore proposed for use in mowers and harvesters have proved unsatisfactory and are not at present in practical use. As previously designed, the cutting knives of the endless chain cutters have not been maintained in proper cutting relation, but in practice the two sides of the endless chain have pulled apart, or the cooperating cutting knives have had a tendency to pivot with respect to each other. I have discovered that this defect in the previous chain cutter has been due to the fact that the line of pull on the chains forming the cutter have been too far separated from the plane of the intended cooperating cutting action of the cutters. By means of the present invention, an endless chain cutter is provided in which the plane of cooperating cutting action is brought close to the line of pull between the links forming the endless chain, and the individual links and their cutting faces so formed as to provide large cooperating areas designed to inhibit relative pivoting of the cutting knives.

It is, therefore, an object of the present invention to provide an endless chain cutter in which the individual links of the chain cutter and the cutting blade attached thereto are so formed as to show the line of pull on the chain as nearly as possible to the intended plane of cutting action.

Further objects of the present invention are to provide an endless chain cutter for a mower with the guard means by which the cooperating sections of the chain may be held in proper position and which guard means is capable of being adjusted to compensate for wear.

Various further objects and advantages of the present invention will be apparent from a description of the preferred form or example of a mower or harvester embodying the present invention. There is hereafter described, in connection with the accompanying drawings, such a preferred form of mower or cutter or sickle therefor.

Referring to the drawings:

Figure 1 is a top plan view.

Figure 2 is a rear elevation.

Figure 3 is an enlarged vertical section on the line 3—3 of Figure 1.

Figure 4 is an enlarged vertical section on the line 4—4 of Figure 1.

Figure 5 is a diagrammatic elevation of the movement of the chain cutter on the line 5—5 of Figure 1.

Figure 6 is an elevation, partially in section, of the outer shoe.

Figure 7 is a perspective view of the cooperating chain cutters.

Figure 8 is a perspective view of an individual link of the cutting chain.

Figure 9 is a fragmentary detail showing a modified form of cutting blade.

Referring to the drawings, the sickle or cutter is supported at one end by the bifurcated frame member 2. The bifurcated member 2 has spaced arms 3 and 4 supporting an axle 5. For this purpose, the arms 3 and 4, respectively, support pins 6 and 7 which are threaded into sockets in the ends of the axle 5. The axle 5 is indicated as mounting a sprocket 8 for the inner end of the chain, and between the sprocket 8 and axle 5 is provided a bearing 9. The sprocket 8 has its hub 10 threaded to a sprocket 11, which sprocket is intended to receive a chain 11ª, which may lead to the power take-off (not shown) of the mower. The sprocket 11 fits against the shoulder 12 of the axle and the sprockets 8 and 11 are held in position by a sleeve 12ª having a set screw 13.

The pins 6 and 7 are respectively journaled to ears 14 and 15 of a shoe 16, and to the shoe 16 is bolted, as indicated at 17, a further flexible shoe 18. The shoe 16 further supports the end of a bar 19, which bar 19 is for the purpose of supporting the guide 20 of the cutter. At its outer end the bar 19 is fixed to a plate 21 which has arms 21ª carrying a wheel 22. The bar 19 is also at its outer end further bolted to a bracket 23, which carries a pin 24 mounting a sprocket 25 around which the outer end of the chain cutter is trained. The cutting chain is, therefore, endlessly connected between sprockets 8 and 25 and adapted to be driven by power from the sprocket 11.

The construction of the individual links of the cutting chain is an important feature of the present invention. The individual links, as clearly indicated in Figures 7 and 8, are formed out of a single piece of flat metal, one portion 26 of which is originally of a substantially rectangular shape, although the corners thereof may be rounded and the other portion 32 of which extends in the form of a triangle therefrom to form a cutting blade. An opening is cut in the chain portion 26 of the flat plate to allow the insertion of sprocket teeth through the chain, and in cutting said opening two tongue portions are provided, one of which is curved into about three quarters of a circle, as indicated at 27, to form with a complementary curved end of the link portion 26 an eye at the end of the link, the two portions being separated, as indicated at 28, in order to permit the insertion of the pins formed on adjacent links. The opposite tongue portion formed in cutting the central opening is bent out, as indicated at 29, to cooperate with the adjacent downwardly bent portion of the rectangular portion of the plate to form a pin on the end of the link adapted to be received within the eye of a similar adjacent link. Thus, each link of the chain is formed of a single piece of metal and comprises an eye and a pin connected by a bar portion 30 and by a bar 31, which is continued to form the cutting blade 32. The bars 30 and 31 lie in the same plane as the cutting blade 32, and said plane passes tangentially through the inner edges of the portion 27 forming the eye of the link. All of such parts, therefore, are capable of cooperating together to form bearing surfaces for the individual links capable of bearing against similar surfaces of the opposite side of the chain when the two oppositely moving chain portions are brought into face to face contact, as indicated in Figure 7. Each individual link of the chain has its bar 31 shaped to form a cutting blade 32 having a beveled cutting face 33. The lower face of the cutting blade 32, as indicated in Figure 8, lies in the plane of the bearing surfaces of the link and is thus adapted to lie truly flat against a similar face of the cutting blades of the adjacent portion of the chain.

In Figures 7 and 8 of the drawings the cutting blades are indicated in the form most suitable for ordinary mowing, but in certain cases where the mower is to be used in cutting heavy brush or the like a modified form of cutting blade may be used, as indicated in Figure 9, where the cutting blades 32ª are indicated as provided with saw teeth 33ª.

With the construction of the chain as thus described it will be seen that the individual links of the chain are adapted to cooperate together to form shearing cutters with the surface of contact between the same consisting not only over the areas of the blades but back and including the bars 30 and 31 of the links, as well as portions of the eye 27, which cooperating contact surfaces of links of the opposite sides of the chain permit the same to be held and moved in proper cutting relation without relative pivoting or tilting, which is found to seriously interfere with the action of the cutter where permitted. An important feature in securing or maintaining the proper cutting relation between the two oppositely moving portions of the chain is the formation of the links, as described, with the bars of the link which connect the eyes and pins of the link in substantially the same plane as the cutter blades 32 and at a substantial tangent with the eyes of the link. Such formation of the individual links of the chain brings a line of pull on the oppositely moving sections of the chain as close as possible to the plane of cutting action of the cutter. Previously designed endless cutters which have had the lines of pull on the two co-operating chains disposed more remotely from the plane of cutting action are found to be relatively unsatisfactory in operation inasmuch as they tend to separate the cutting blades of the adjacent portions of the chain interfering with the cutting action thereof.

In order to hold the oppositely moving portions of the chain in proper cutting relation there is provided a guide 20. The guide 20 is formed by a lower plate member 35 and an upper plate member 36, which plate members extend between the sprockets 8 and 25, as indicated diagrammatically in Figure 5. The outer ends of the plate members 35 and 36 are turned inwardly to provide a narrow opening through which the cutting blades 32 of the adjacent chain portions may extend and the inner ends of the plate members 35 and 36 are clamped together by bolts 37, which likewise support the plate members on the bar 19. The inner faces of the plate members 36 and 37 are intended to provide bearing contact with the outer faces of the links of the chain and to thereby hold the cooperating portions of the chain in the proper cutting relationship. For this purpose, shims 38 are provided between the plates 35 and 36, which are removable for substitution of different-sized shims in order to take care of any wear of either the guides or the links of the chain which might tend to permit adjacent chain portions to separate. It is to be understood that the inner faces of guides 35 and 36 may, if desired, be lined with bearing metal or in certain cases the inner faces may be provided with rubber bearing surfaces (not shown). The ends of the upper guide plate 36 are curved upwardly, as indicated at 39 and 40, to direct the upper portion of the chain into the guides 20, and it is preferable that the lower portions of sprockets 8 and 25 be in alignment with the guide and the sprocket 8 driven in a direction to oppose the pull fixed on the lower chain portion.

By means of the mower thus described it has been found possible to secure mowing speeds much higher than is permissible with the present reciprocating type of mower cutters. Many other advantages of the mower of the present invention exist. The mower, for example, has been found to be well adapted for very heavy cutting, and particularly by slowing the forward progress of the mower relative to the speed of the chain cutter the mower of the present invention is adapted to cut through heavy stubble or for other cutting operations where the present type of mowers fail.

While the particular form of mower or cutter therefor herein described is well adapted to carry out the objects of the present invention, it is to be understood that various modifications and changes may be made, and the present invention is of the scope of the appended claims.

I claim:

1. A link for an endless chain cutter of a harvester, said link being formed of a metal plate and having a cutting blade portion and a link portion, the link portion having a central opening for receiving a sprocket pin, and tongues formed at said opening bent to form eyes and pins for said link, the plane of the cutting blade portion passing tangential to the eye of the link portion, so that contact may be maintained between both the link portions and plate portions of cooperating links.

2. A cutter for an endless harvester chain, said cutter being formed of a plate of metal having a link portion and a cutter blade portion, the link portion having a central opening defining two bars, the cutter blade being an extension of one of said bars, the plate at one end of the link portion being bent to form an eye and at the other end of the link portion to form a pin adapted to fit within a similar eye in an adjacent link member, the plane of the cutter blade including the bar and being tangential to the eye of said cutter link so that two of such cutters may be brought into cooperating cutting positions in which contact is maintained between both bars and the blade portion of one cutter with the corresponding parts of the cooperating cutter.

3. A sickle for a harvester machine, comprising sprockets, an endless chain trained over said sprockets, guide means for the portions of said chain intermediate said sprockets, said guide means being adapted to hold the oppositely moving portions of the chain in face to face contact, and means for adjusting said guide means to compensate for wear the individual links of said endless chain being formed of metal plates including chain portions having central openings to fit over said sprockets leaving front and rearward bars, the link portion of said plate being curved to form an eye at one end and a pin at the other end, the forward bar of the link portion having cutting blades.

4. A sickle for a harvesting machine, comprising a pair of sprockets, an endless chain cutter trained over said sprockets, a cutter guide interposed between said sprockets and adapted to retain the oppositely moving portions of said cutter chain in face to face contact for cooperating cutting action, said guide including upper and lower plate, and means for adjusting said plates relative to each other to compensate for wear.

5. A sickle for a harvesting machine, comprising a pair of sprockets, an endless chain trained over said sprockets, said endless chain being formed of cutting links, each cutting link being formed of a plate of metal having a link portion and a blade portion, the link portion having a central opening defining two bars, the cutter portion being an extension of one of said bars, with its cutting face lying in the same plane as the other bar, each cutter link having a pin portion at one end and an eye portion at the other end for connection with adjacent cutting links arranged to permit the contact to be maintained between the oppositely moving portions of the endless chain with the face of the cutting blades and bars of the cutting links contacting the corresponding elements of the cooperating cutting links.

6. A sickle for a harvesting machine, comprising a pair of sprockets, an endless chain trained over said sprockets, said endless chain being formed of cutting links, each cutting link being formed of a plate of metal having a link portion and a blade portion, the link portion having a central opening defining two bars, the cutter portion being an extension of one of said bars, with its cutting face lying in the same plane as the other bar, each cutter link having a pin portion at one end and an eye portion at the other end for connection with adjacent cutting links arranged to permit the contact to be maintained between the oppositely moving portions of the endless chain with the face of the cutting blades and bars of the cutting links contacting the corresponding elements of the cooperating cutting links, and a cutter guide interposed between said sprockets and adapted to retain the oppositely moving portions of said chain in said contacting cooperating position.

7. A sickle for a harvesting machine, comprising a pair of sprockets, an endless chain trained over said sprockets, said endless chain being formed of cutting links, each cutting link being formed of a plate of metal having a link portion and a blade portion, the link portion having a central opening defining two bars, the cutter portion being an extension of one of said bars, with its cutting face lying in the same plane as the other bar, each cutter link having a pin portion at one end and an eye portion at the other end for connection with adjacent cutting links arranged to permit the contact to be maintained between the oppositely moving portions of the endless chain with the face of the cutting blades and bars of the cutting links contacting the corresponding elements of the cooperating cutting links, and a cutter guide interposed between said sprockets and adapted to retain the oppositely moving portions of said chain in said contacting cooperating position, said guide including upper and lower blades, and means for adjusting said blades relative to each other to compensate for the wear of the cutting links.

CHARLES E. BLALACK.